US006766831B2

(12) United States Patent
Oliver

(10) Patent No.: US 6,766,831 B2
(45) Date of Patent: Jul. 27, 2004

(54) EDUCTOR

(75) Inventor: Stephen G Oliver, Annesley (GB)

(73) Assignee: JohnsonDiversey, Inc., Sturtevant, WI (US)

(*) Notice: Subject to any disclaimer, the term of this patent is extended or adjusted under 35 U.S.C. 154(b) by 185 days.

(21) Appl. No.: 10/140,979

(22) Filed: May 8, 2002

(65) Prior Publication Data

US 2002/0166593 A1 Nov. 14, 2002

(30) Foreign Application Priority Data

May 14, 2001 (EP) ............................................ 01304253

(51) Int. Cl.$^7$ ................................................ G05D 11/03

(52) U.S. Cl. ....................................... 137/893; 137/270

(58) Field of Search ................................ 137/893, 270; 138/46; 251/206, 207

(56) References Cited

U.S. PATENT DOCUMENTS

| | | | | | |
|---|---|---|---|---|---|
| RE25,037 | E | * | 9/1961 | Brazier | |
| 3,072,137 | A | | 1/1963 | McDougall | 137/216 |
| 3,166,611 | A | * | 1/1965 | Conant et al. | 261/41.5 |
| 3,539,111 | A | * | 11/1970 | Johnson | 239/318 |
| 3,583,608 | A | | 6/1971 | Green | 222/402 |
| 3,894,662 | A | * | 7/1975 | Eddy et al. | 222/630 |
| 3,998,227 | A | * | 12/1976 | Holbrook et al. | 604/119 |
| 4,059,175 | A | | 11/1977 | Dressell, Jr. | 188/285 |
| 4,166,580 | A | * | 9/1979 | Meckel | 239/542 |
| 4,200,119 | A | | 4/1980 | Cunningham | 137/605 |
| 4,298,101 | A | | 11/1981 | Dressell, Jr. | 188/285 |
| 5,522,419 | A | | 6/1996 | Sand | |

FOREIGN PATENT DOCUMENTS

| | | | |
|---|---|---|---|
| EP | 0 288 180 | 10/1988 | 4/14 |
| EP | 726 874 | 7/1997 | |
| GB | 2163492 | 2/1986 | 59/26 |
| GB | 2345122 | 6/2000 | 21/26 |
| WO | 94/04857 | 3/1994 | |

* cited by examiner

*Primary Examiner*—Stephen M. Hepperle

(74) *Attorney, Agent, or Firm*—Neil E. Hamilton; Warren R. Bovee; Renee J. Rymarz

(57) ABSTRACT

An eductor (1) for mixing liquids, e.g. a concentrated solution into water, has a flow passage (16) for a first liquid into which a dispensing passage (18) for a second liquid opens so that in use the second liquid is drawn into the flow of the first liquid. The dispensing passage (18) including a flow restrictor portion provided by a groove (22) extending on the periphery of a restrictor plug (19) removably received in a socket (21) of the eductor body. The groove (22) and the wall of the socket (21) define the flow rate in the dispensing passage. The plug (19) has a plurality of the grooves (22) and is selectively insertable into the socket in a plurality of positions, the grooves providing respectively different flow rates of the second liquid.

6 Claims, 4 Drawing Sheets

EDUCTOR

FIELD OF THE INVENTION

Figure 1:
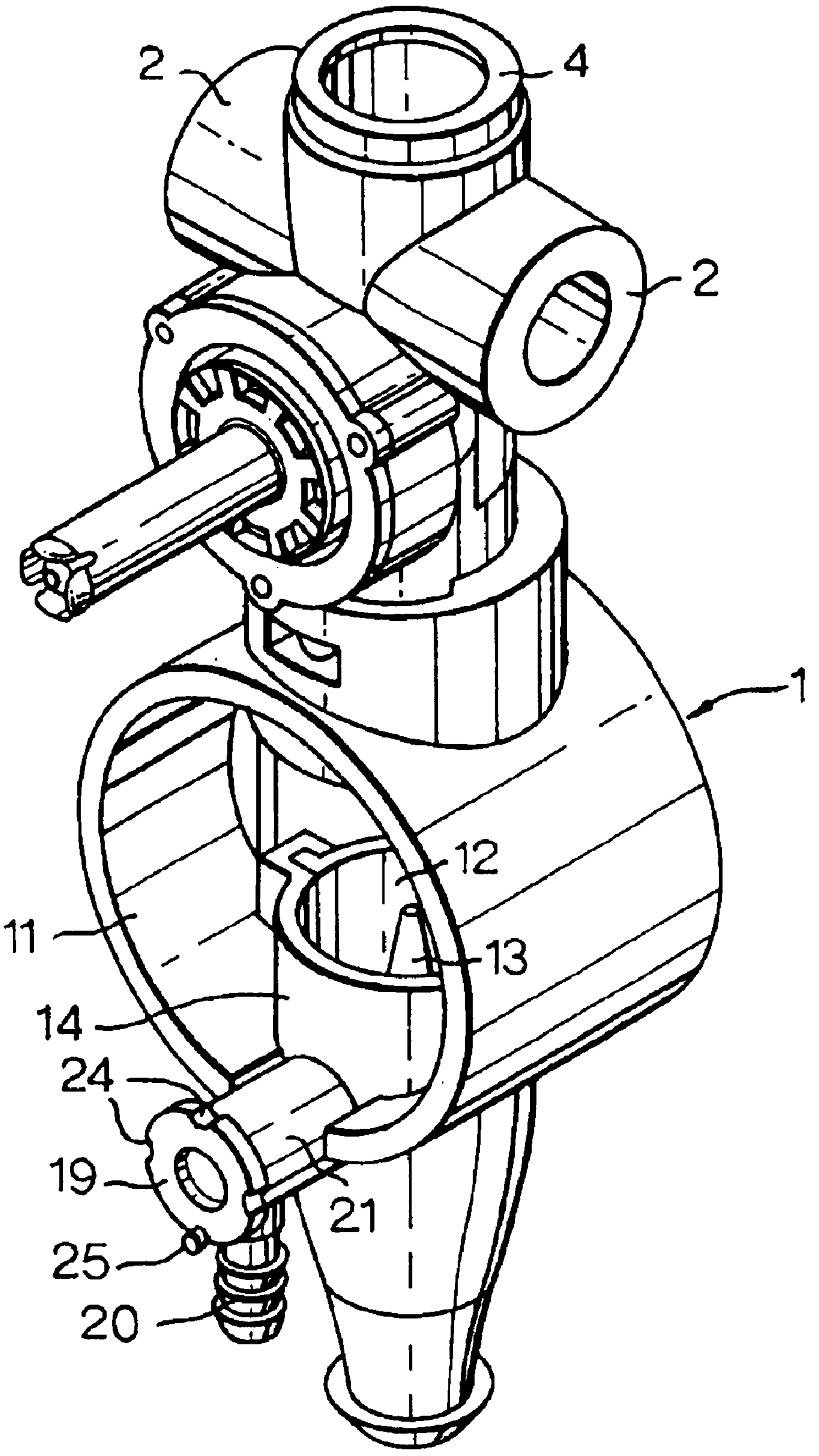

This invention relates to an eductor for mixing liquids, for example mixing a concentrated solution into a flow of water to provide a desired dilution of the concentrated solution. The invention also relates to a dispensing apparatus having such an eductor.

BACKGROUND OF THE INVENTION

It is common practice in many industries, such as hotels and catering, for chemicals such as those used for cleaning to be purchased as concentrated liquids and then diluted with water to give the correct concentrations for use. Proportioning dispensing apparatus have been designed to achieve the desired dilution of the concentrated solution and dispense the mixed diluted solution.

These dispensers have commonly employed venturi-type devices, known as eductors, to aspirate or draw the concentrated solution into the water stream. In these eductors water travelling through a passage entrains the concentrated solution at a point where a restricted flow channel in the passage widens.

These dispensers are generally operated with water provided directly from the mains supply. In this case it is important to maintain the water supply free of contamination and thus to prevent backflow of the chemicals into the water source. In order to achieve this the eductors generally employ an air gap. Such eductors commonly have a nozzle upstream of the eductor passage, which nozzle defines a stream of water passing across an unobstructed gap in the eductor body prior to entering the passage. Some eductors also employ means to reduce splash back at the entrance to the eductor passage.

In order to ensure that the solution is dispensed at the desired concentration, a method of flow regulation is required to control the amount of concentrated solution drawn into the water flow. This has been achieved in previous eductors such as disclosed in U.S. Pat. No. 5,522,419 and WO94/04857 by means of an element having a small aperture or metering orifice in the concentrated solution feed line. This method of flow regulation has several disadvantages primarily due to the fact that the aperture is easily blocked by solid particles or deposits. This leads to problems in the accuracy and functioning of the dispensing apparatus. Such flow control devices are small elements located inside the liquid feed line and hence are difficult to remove for cleaning or changing. They are also easily damaged, during attempts to clean them.

SUMMARY OF THE INVENTION

An object of the present invention is to avoid or reduce the problems of flow restriction in eductors mentioned above. According to the invention there is provided an eductor for mixing liquids, having an eductor body containing a flow passage for a first liquid into which a dispensing passage for a second liquid opens so that in use the second liquid is drawn into the flow of the first liquid, the dispensing passage including a flow restrictor portion, wherein the flow restrictor portion is provided by a groove extending on the periphery of a restrictor plug removably received in a socket of the eductor body, the groove and the wall of the socket defining the flow restrictor portion of the dispensing passage.

This restrictor plug, having a flow-restricting groove in its periphery, is easily removed from and inserted into its position in the eductor body. It is easily manufactured to the desired accuracy and is easily cleaned, while being less liable to damage than an element having a small orifice. The plug may be arranged to be easy to insert and remove, without disturbing other portions of the flow line for the second solution, e.g. a hose connection.

Preferably the plug has a cylindrical periphery in which said groove is formed, and preferably the groove extends axially or helically along the cylindrical periphery. These are simple constructions, easy to manufacture and assemble. High precision can easily be achieved. If the plug is made by injection moulding of a plastics material, it can be avoided that "flash" appears at the flow-restricting groove or grooves. By contrast, when forming an aperture by injection moulding, it is difficult to avoid flash at the aperture, leading to poor accuracy or more steps in the process.

Where appropriate the restrictor plug may have a plurality of the grooves and is selectively insertable into said socket in a plurality of positions, whereby the grooves provide respectively different flow rates of the second liquid. To provide for correct positioning or indexing of the plug restrictor in the eductor body, preferably the plug and the eductor body have mutually engageable locating shapes to determine the rotational position of the plug in the socket. The locating shapes may comprise a projecting pin on the eductor body and at least one groove in the periphery of a flange of the plug.

BRIEF INTRODUCTION OF THE DRAWINGS

Figure 2:
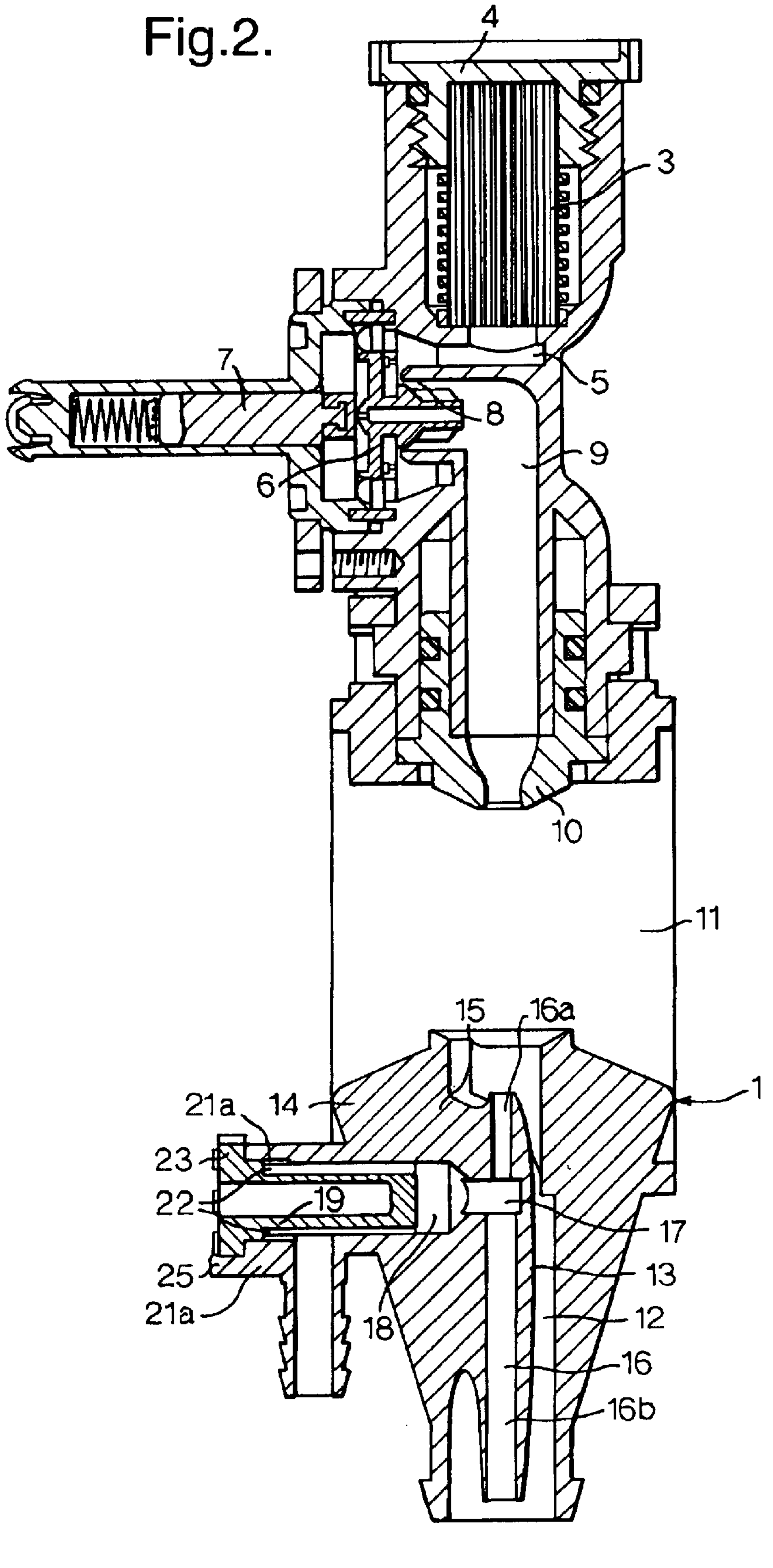
Figure 3:
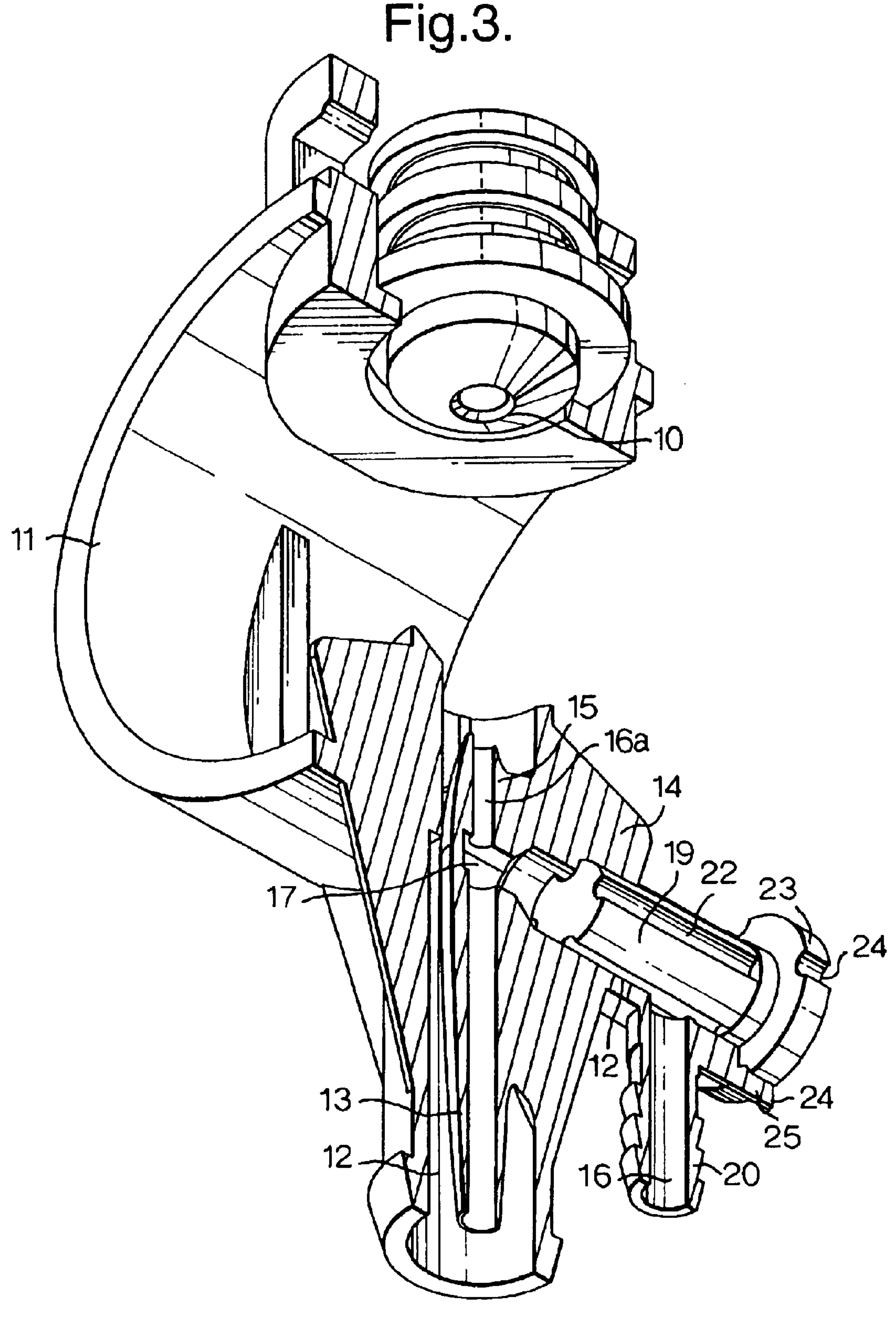
Figure 4:
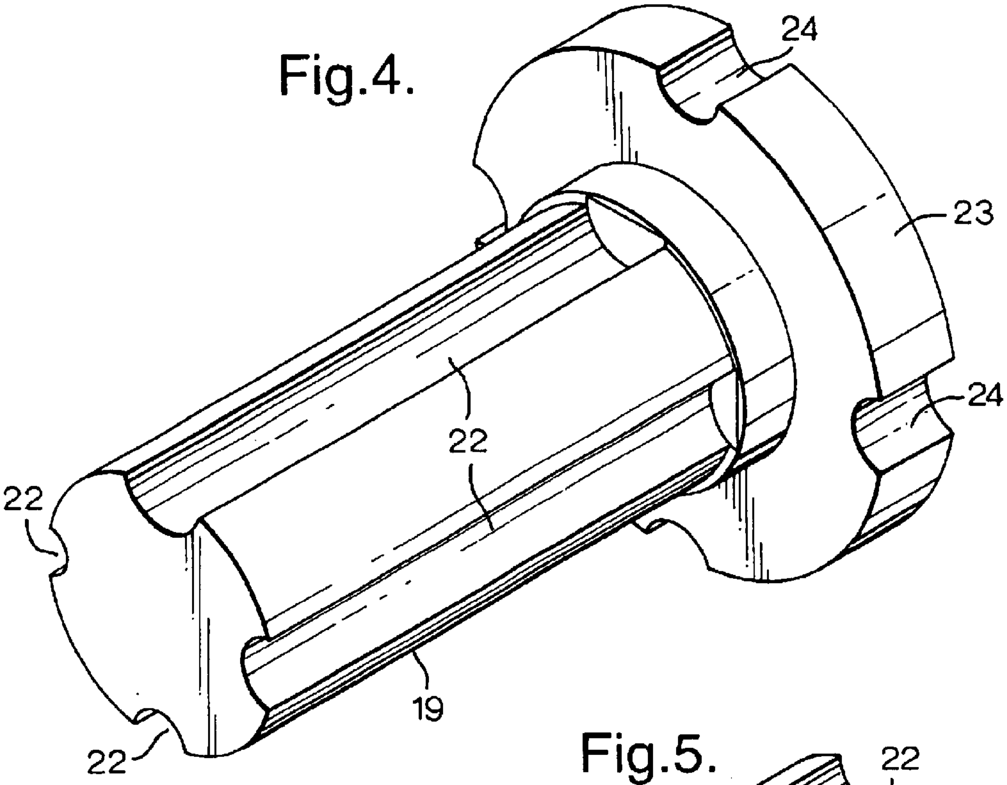
Figure 5:
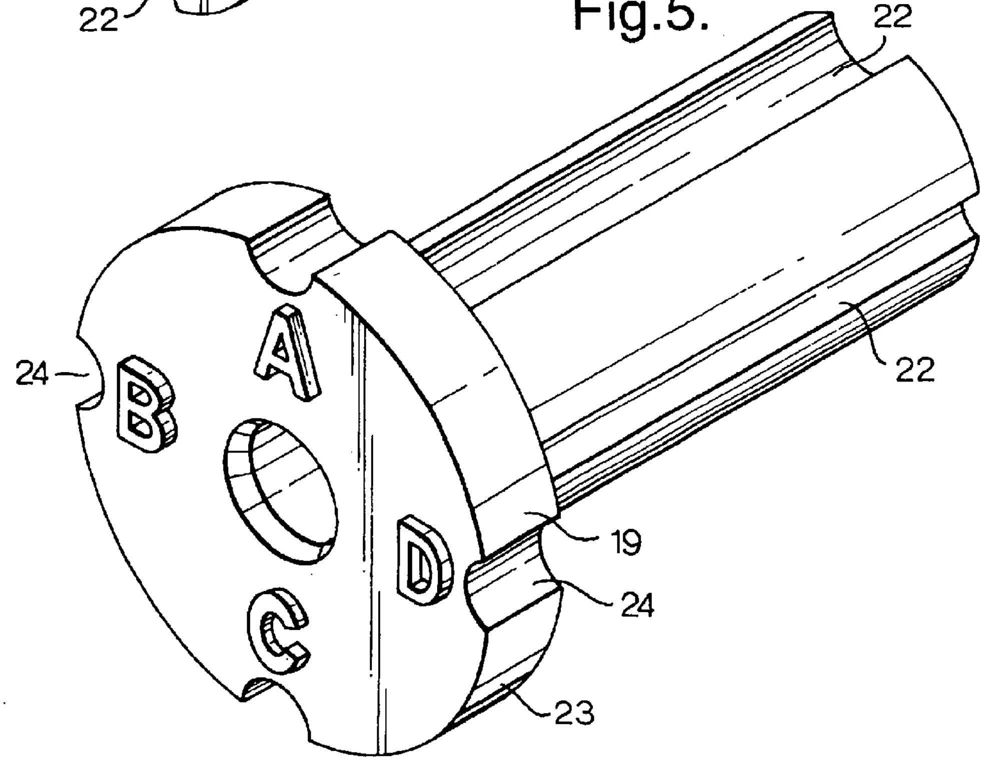

An embodiment of the invention will now be described by way of non-limitative example, with reference to the accompanying drawings, in which:

FIG. 1 is a perspective view of an eductor for mixing liquids, embodying the invention, FIG. 2 is an axial cross-sectional view of the eductor of FIG. 1, on a larger scale, FIG. 3 is a partially cut-away perspective view of a portion of the eductor of FIGS. 1 and 2, FIG. 4 is a perspective view on one end of the flow-restrictor plug of the eductor of FIGS. 1 to 3 on a yet larger scale, and FIG. 5 is a perspective view on the other end of the plug of FIG. 4.

DESCRIPTION OF THE PREFERRED EMBODIMENT

FIGS. 1 to 5 show the eductor 1 embodying the invention, which is made of a plurality of molded plastics components, except as described below. At its top are two lateral inlets 2, to allow choice of the inlet direction. In use a pressurised liquid, e.g. mains water, is supplied to one of the inlets 2, the other inlet which is not in use being blanked off or connected to one or more similar eductors for metering other solutions. The inlets 2 lead to a removable strainer or filter 3, e.g. of metal mesh or plastics material mesh, carried by a holder 4 which fits into the top of the eductor body 1.

From the lower open end of the cylindrical filter 3, a passage 5 connects to a magnetically operated diaphragm valve 6 having a non-rusting magnetically attracted steel core body 7 carrying a diaphragm which is movable by means of an external magnet (not shown) in order to open a flow passage 8 leading to a first main axial passage 9 of the eductor. The construction and operation of the valve 6 is not relevant to the present invention, and need not be described in detail. Any suitable alternative valve arrangement, such as a ball valve or electrically operated valve, may be used for opening and closing the main liquid flow through the eductor.

The first main flow passage 9 leads to a nozzle 10 opening into an air gap region 11 of the eductor, at which the eductor body is open at both front and rear to the exterior air. The nozzle 10 in use projects a stream of the liquid from the passage 9 across the air gap 11 towards an upwardly projecting bullet-shaped tube 13 which is mounted centrally in a wide flow passage 12 by means of a fin 15 projecting inwardly from the wall 14 of the passage 12.

The tube 13 has a central axial passage 16 which receives part of the jet of liquid projected from the nozzle 10 across the air gap 11. As FIGS. 2 and 3 show, the passage 16 first has a narrow portion 16*a* which is of constant width or, as shown, narrows slightly in cross-sectional area and at the downstream end of this narrow portion 16*a* the passage 16 opens into a wider mixing region 17 at which a side passage 18 extending through the fin 15 connects. Downstream of the mixing region 17, the passage 16 in the tube 13 continues as a portion 16*b* of uniform cross-section, which at its lower end opens into the lower portion of the wide passage 12. The wide passage 12 opens at the lower end of the eductor, where the liquid can be directed directly into a receiving container, or a connection made to a tube or pipe as desired.

The upper portion of the tube 13 has a tapering wall, curved in vertical cross-section, which is very thin at its upper end, so as to present an annular almost knife-like edge to the jet of liquid from the nozzle 10. This shape minimises splash-back of liquid, which might eject from the air gap openings. Only a portion of the jet of liquid from the nozzle 10 enters the passage 16, the remainder passing outside the tube 13 in the passage 12. The fin 15 also has an appropriate stream-lined shape, to minimise splash-back and flow disturbance.

The side passage 18 together with a flow restrictor plug 19 and an inlet connector 20 provide the flow-restricting inlet passage for the second liquid, which at the mixing portion 17 is drawn into and mixed with the flow in the passage 16 of the tube 13. The axial direction of the connector 20 is parallel to that of the passage 16, so that a pipe or hose connecting to the connector 20 does not project laterally, thus minimising the space required for the eductor and reducing the danger of accidental disconnection from the connector 20.

The flow restrictor plug 19 has a cylindrical peripheral surface and is received by push-fitting in a complementary cylindrical socket 21 in a projecting portion 21*a* of the eductor body. The cylindrical surface of the plug 19 has four axially extending grooves 22 spaced apart 90° around its circumference. Alternatively, the grooves 22 may be helical, again uniformly spaced around the periphery of the plug. A number of grooves other than four may be provided, as appropriate.

The plug has a circumferential flange 23 which projects radially from the cylindrical surface and has four locating grooves 24 which selectively locate on a projecting pin 25 of the eductor body, in order to orient the plug 19 in any one of four selectable positions relative to the eductor body. In each of these four positions, one of the grooves 22 is aligned with the upper end of the flow passage of the connector 20. This groove 22 thus connects the flow passage of the connector 20 to the side passage 18 and defines, together with the surface of the socket 21, a narrow flow-restricting path for the second liquid, controlling the rate at which the second liquid passes to the mixing portion 17. By making the axial grooves 22 of respectively different sizes (either in depth or width or both), the plug 19 provides four different flow-restriction rates for the second liquid, selectable by removing the plug and reinserting it at a different position. The plug 19 is a tight enough fit in the socket 21 to seal the flow of the second liquid except at the selected groove 22, but sufficiently loose to be easily removable for replacement, cleaning, or selection of the rotational position in which it is inserted. Leakage to the exterior is prevented by a push-fit seal at the enlarged diameter portion 21*b* next to the flange 23.

The plug 19 is advantageous not only because of the selectability of the different grooves 22, but also because each small cross-section groove 22 is easily cleaned, if there is any blockage due to a solid particle in the second liquid or due to any accumulation of dirt. The cleaning operation is not likely to damage the grooves 22 or affect their shape, so that the risk of inadvertent alteration of the flow restriction is avoided. As mentioned above, the grooves 22 can be easily produced by injection moulding, with high precision.

The eductor shown may be mounted in a dispensing apparatus, such as that shown in EP-A-726874, which an inlet 2 connected to a water mains and its inlet connector 20 connected to a container for a concentrated solution, e.g. of a cleaning agent, which is to be diluted and dispensed. Removal and replacement of the plug 19 can be easily done without disconnection of the hose attached to the connector 20.

What is claimed is:

1. An eductor for mixing liquids, having an eductor body containing a flow passage for a first liquid into which a dispensing passage for a second liquid opens so that in use the second liquid is drawn into the flow of the first liquid, the dispensing passage including a flow restrictor portion, wherein the flow restrictor portion is provided by a groove extending on the periphery of a restrictor plug removably received in a socket of the eductor body, the groove being of uniform dimension throughout its length, the groove and the wall of said socket defining the flow restrictor portion of the dispensing passage.

2. An eductor according to claim 1, wherein said plug has a cylindrical periphery in which said groove is formed.

3. An eductor according to claim 1, wherein said groove extends axially or helically along said cylindrical periphery.

4. An eductor according to claim 1, wherein said plug has a plurality of said grooves and is selectively insertable into said socket in a plurality of positions, whereby said grooves provide respectively different flow rates of the second liquid.

5. An eductor according to claim 1, wherein said plug and said eductor body have mutually engageable locating shapes to determine the rotational position of the plug in the socket.

6. An eductor for mixing liquids, having an eductor body containing a flow passage for a first liquid into which a dispensing passage for a second liquid opens so that in use the second liquid is drawn into the flow of the first liquid, the dispensing passage including a flow restrictor portion, wherein the flow restrictor portion is provided by a groove extending on the periphery of a restrictor plug removably received in a socket of the eductor body, the groove and the wall of said socket defining the flow restrictor portion of the dispensing passage, said plug and said eductor body have mutually engageable locating shaves to determine the rotational position of the plug in the socket, wherein the locating shapes comprise a projecting pin on the eductor body and at least one groove in the periphery of a flange of the plug.

* * * * *

UNITED STATES PATENT AND TRADEMARK OFFICE

CERTIFICATE OF CORRECTION

PATENT NO. : 6,766,831 B2
DATED : July 27, 2004
INVENTOR(S) : Stephen G. Oliver

It is certified that error appears in the above-identified patent and that said Letters Patent is hereby corrected as shown below:

Column 4,
Line 62, replace “shaves” with -- shapes --.

Signed and Sealed this

Eighteenth Day of October, 2005

JON W. DUDAS
*Director of the United States Patent and Trademark Office*